2,674,422

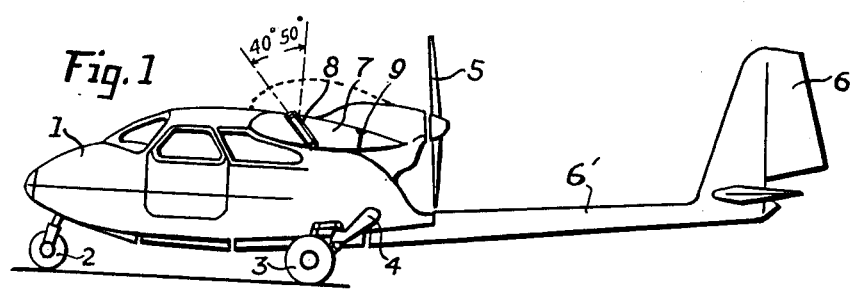
Fig. 1
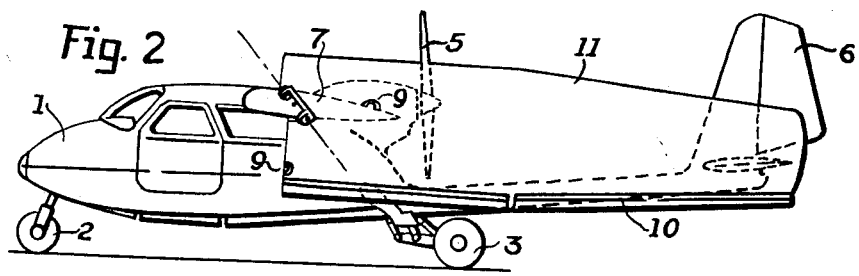
Fig. 2
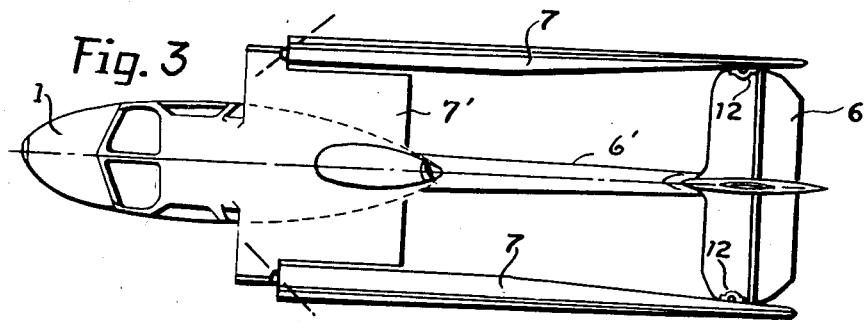
Fig. 3
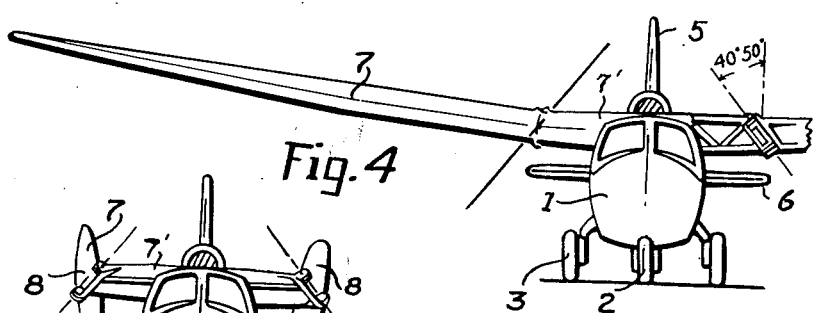
Fig. 4
Fig. 5
INVENTOR
LUIGI PELLARINI
BY Young, Emery & Thompson
ATTORNEYS Patented Apr. 6, 1954

UNITED STATES PATENT OFFICE 2,674,422

FOLDING WING FOR ROADABLE AIRCRAFT

Luigi Pellarini, Milan, Italy

Application May 8, 1950, Serial No. 160,596

Claims priority, application Italy May 12, 1949

1 Claim. (Cl. 244—49)

The present invention relates to an aircraft which when its half wings are folded at the sides of the frame and with retrocession of the back wheels, can be turned into a screw propelled land vehicle.

According to the invention the half wings are provided at their ends with a main coupling for their connection with the middle trunk of the wing fixed to the frame, which remains permanently hingedly connected with the corresponding coupling on the wing middle trunk, and with at least one secondary coupling easily releasable from its corresponding coupling fixed to the middle trunk, the main hinge coupling having a slanting pivotal axis which guides the half wings in their backward movement so as to place them with their wing plane just about vertical and parallel to the middle surface of symmetry of the aircraft.

In this way the half wings extend along the frame and their ends lie in close proximity to the empennages to which they can be coupled rigidly so as to completely close in the propeller.

The invention will be described with more particulars in connection with the accompanying drawing in which:

Figures 1 and 2 show schematically side elevational views of an aircraft in a flight position and with the wings folded, respectively.

Fig. 3 is a plan view of the aircraft with the wings folded.

Figures 4 and 5 represent two front views respectively with the wings in the flying position and in the folded position.

The aircraft according to the present invention embodies a frame 1, front wheel 2 and the undercarriage 3 fixed on axis 4. The aircraft is driven by a propeller 5 and has a rearwardly extending strut 6' carrying the control and stability surfaces 6. In accordance with this invention the two half wings 7 are fixed on the middle trunk 7' with a main hinged coupling having a slanting axis 8, and secondary releasable coupling 9 behind the main coupling 8. The axis of the hinged coupling is approximately slanting at 45° in regard to the three cartesian axes and in front it is displaced in regard to the center of pressure line of the half wing.

In the flying position the secondary coupling 9 on the half wings 7 is attached to the corresponding fixed coupling on the middle wing trunk 7', and the half wings 7 are therefore stably coupled with the middle wing body 7' and in a position to hold out against all outside stresses in the three orthogonal surfaces.

When the aircraft has to be changed into a land vehicle all that has to be done is to release the secondary couplings 9 so that the half wings when thrust backwards turn around the slanting axis at an angle of more than 90°. Rotation takes place in accordance with a trajectory which is the result of the circular trajectories of the half wings around the three projections of the rotation axis in the three orthogonal surfaces. Following this resulting movement each half wing is placed with the wing chords in a practically vertical surface and with its opening rests substantially parallel with the lengthwise plane of symmetry of the vehicle. In this way the trailing edge 10 of the half wing is directed towards the ground and leading edge 11 of the section, upwards. In this position the ends of the half wings 7 can come into contact with the back empennages of the vehicle, with which they can be coupled rigidly with a coupling 12, so as to completely close in the propeller and prevent entrance from the outside to the screw in movement for the purpose of safeguarding persons and things in the surroundings.

Of course the vehicle must be of such measurements that when the wings are folded it does not take up more space than the front and crosswise measurements called for by the vehicle traffic regulations.

To guaranty the stability and manoeuvring of the land vehicle in its movement on roads, seeing that with the half wings folded the center of gravity of the vehicle moves backwards, the wheel 3 can be made movable backwards too, by making the legs of the carriage rotate around the axles 4, so as to ensure, even with the center of gravity displaced, that the front wheel always adheres to the road to the proper extent.

The secondary coupling 9 in the description is provided for at the back of the principal coupling 8 with reference to the direction of movement of the vehicle, but in certain cases it can be advantageously applied in front or there can also be two, releasable either separately or at the same time, arranged at the two sides of the hinge coupling 8.

The other constructional particulars of the vehicle with reference to the couplings, movability of the carriage etc. can vary to be suitable for the different types of aircraft, etc. without departing from the scope of this invention.

What I claim is:

An aircraft of the character described comprising a cabin, a propeller at the rear of the cabin, a short stub sustaining wing extending laterally outwardly from each side of the upper rear portion of the cabin forwardly of the propeller, the span of said stub wings being greater than the diameter of the propeller, a tail structure at the rear of the aircraft, means extending rearwardly from the cabin and supporting said tail structure, an extension sustaining wing for each stub wing, and hinge means positioned closer to the leading edge of the wings than to the trailing edge for mounting each extension wing on its stub wing, each hinge means having its hinge axis fixedly inclined at an angle of about 45° with respect to the three cartesian axes of the aircraft with the upper portion of each hinge axis lying more forward and nearer the longitudinal central plane of the aircraft than the lower portion thereof to cause the chords of the extension wings to swing from a general horizontal to a vertical position upon swinging the extension wings rearwardly about the hinges to lie against the tail structure and thereby form an enclosure on each side of the propeller.

References Cited in the file of this patent

UNITED STATES PATENTS

| Number | Name | Date |
|---|---|---|
| 1,556,414 | Bumpus | Oct. 6, 1925 |
| 1,793,056 | Carns | Feb. 17, 1931 |
| 2,434,068 | Geisse | Jan. 6, 1948 |

FOREIGN PATENTS

| Number | Country | Date |
|---|---|---|
| 274,151 | Great Britain | July 11, 1927 |
| 447,577 | Great Britain | May 21, 1936 |
| 506,528 | Great Britain | May 30, 1939 |
| 559,819 | Great Britain | Mar. 7, 1944 |